US008806198B1

(12) United States Patent
Chaudhry (10) Patent No.: US 8,806,198 B1
(45) Date of Patent: Aug. 12, 2014

(54) METHOD AND SYSTEM FOR AUTHENTICATING A REQUEST

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 363 days.

(21) Appl. No.: 12/717,808

(22) Filed: Mar. 4, 2010

(51) Int. Cl.
*H04L 29/06* (2006.01)

(52) U.S. Cl.
USPC ........ 713/158; 726/6; 726/7; 726/8; 713/156; 713/173; 380/277

(58) Field of Classification Search
CPC ........ H04L 9/30; H04L 12/28; H04L 63/0442
USPC .................................. 726/3, 8; 713/158, 172
See application file for complete search history.

(56) References Cited

U.S. PATENT DOCUMENTS

| | | | | |
|---|---|---|---|---|
| 6,105,012 | A * | 8/2000 | Chang et al. ............... | 705/64 |
| 7,478,434 | B1 * | 1/2009 | Hinton et al. ............... | 726/27 |
| 7,694,319 | B1 * | 4/2010 | Hassell et al. ............... | 725/34 |
| 7,962,938 | B2 | 6/2011 | Barrett | |
| 7,979,447 | B2 | 7/2011 | DaCosta | |
| 2002/0038231 | A1 * | 3/2002 | Hasebe et al. ............... | 705/8 |
| 2002/0101994 | A1 * | 8/2002 | Shinzaki .................... | 380/277 |
| 2003/0110376 | A1 * | 6/2003 | Wiener et al. ............... | 713/158 |
| 2003/0126605 | A1 | 7/2003 | Betz et al. | |
| 2004/0117430 | A1 * | 6/2004 | Bazot et al. ................. | 709/200 |
| 2004/0117824 | A1 | 6/2004 | Karaoguz et al. | |
| 2005/0201561 | A1 * | 9/2005 | Komano et al. ............. | 380/255 |
| 2006/0010469 | A1 | 1/2006 | Reynolds et al. | |
| 2006/0070117 | A1 * | 3/2006 | Spalink et al. .............. | 726/3 |
| 2006/0206728 | A1 * | 9/2006 | Masuda ...................... | 713/193 |
| 2006/0235796 | A1 * | 10/2006 | Johnson et al. .............. | 705/44 |
| 2006/0277316 | A1 | 12/2006 | Wang et al. | |
| 2006/0288227 | A1 * | 12/2006 | Kalofonos et al. .......... | 713/182 |
| 2007/0011702 | A1 | 1/2007 | Vaysman | |
| 2007/0101368 | A1 | 5/2007 | Jacoby et al. | |
| 2007/0124768 | A1 | 5/2007 | Morris | |
| 2007/0192807 | A1 | 8/2007 | Howcroft | |
| 2007/0208718 | A1 | 9/2007 | Javid et al. | |
| 2007/0234410 | A1 * | 10/2007 | Geller ........................ | 726/8 |
| 2007/0239783 | A1 | 10/2007 | Robinson et al. | |
| 2008/0005764 | A1 | 1/2008 | Arling et al. | |
| 2008/0025515 | A1 * | 1/2008 | Coombs ..................... | 380/277 |
| 2008/0154958 | A1 | 6/2008 | Sloo et al. | |
| 2008/0219436 | A1 | 9/2008 | Chen et al. | |
| 2008/0244644 | A1 | 10/2008 | McCausland | |
| 2008/0249961 | A1 | 10/2008 | Harkness et al. | |
| 2008/0310408 | A1 | 12/2008 | Thompson et al. | |
| 2009/0031369 | A1 | 1/2009 | Jeffs et al. | |
| 2009/0055868 | A1 | 2/2009 | Wehmeyer et al. | |

(Continued)

OTHER PUBLICATIONS

Non-final Office action dated Jan. 7, 2014 in U.S. Appl. No. 12/717,812, filed Mar. 4, 2010 by Kapil Chaudhry.

*Primary Examiner* — Morshed Mehedi (57) ABSTRACT

A method and system for communicating between a user network device and a server includes a first server and a user network device that requests an electronic token (eToken) from the first server. The first server communicates the eToken, a signature key, and a server time. The user network device determines a signature using the server time and signature key and communicates a request for data to a second server. The request for data includes a signature. The second server communicates data to a user network device.

30 Claims, 8 Drawing Sheets

(56) References Cited

U.S. PATENT DOCUMENTS

| | | |
|---|---|---|
| 2009/0094656 A1 | 4/2009 | Carlucci |
| 2009/0158336 A1 | 6/2009 | Newdeck et al. |
| 2009/0241145 A1 | 9/2009 | Sharma |
| 2009/0313477 A1* | 12/2009 | Park et al. ............... 713/182 |
| 2010/0017859 A1* | 1/2010 | Kelly et al. ............... 726/5 |
| 2010/0031292 A1 | 2/2010 | Bakker et al. |
| 2010/0049984 A1* | 2/2010 | Masushio et al. ............ 713/179 |
| 2010/0063878 A1 | 3/2010 | Bachet et al. |
| 2010/0082568 A1 | 4/2010 | Lee et al. |
| 2010/0082985 A1* | 4/2010 | Adams ............... 713/170 |
| 2010/0088342 A1 | 4/2010 | Ji et al. |
| 2010/0095063 A1* | 4/2010 | Koraichi et al. ............. 711/115 |
| 2010/0100618 A1 | 4/2010 | Kuhlke et al. |
| 2010/0223471 A1* | 9/2010 | Fresko et al. ............... 713/176 |
| 2010/0235498 A1 | 9/2010 | Handa |
| 2010/0287592 A1 | 11/2010 | Patten et al. |
| 2010/0293579 A1 | 11/2010 | Kulick et al. |
| 2010/0299707 A1 | 11/2010 | Kim et al. |
| 2010/0319025 A1 | 12/2010 | Lee et al. |
| 2010/0325655 A1 | 12/2010 | Perez |
| 2010/0333133 A1 | 12/2010 | Krakirian et al. |
| 2011/0099582 A1 | 4/2011 | Howcroft et al. |
| 2011/0131621 A1 | 6/2011 | Brehm et al. |

* cited by examiner

METHOD AND SYSTEM FOR AUTHENTICATING A REQUEST

TECHNICAL FIELD

The present disclosure relates generally to communication systems for communicating data to a user device, and more particularly, to a method and system for securely communicating data to a user device.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Conditional access is provided at the user device in the form of a card that allows the user device to receive and process signals from the primary service provider.

Providing secure access to data is important for a primary service provider. An example of a type of data that may be provided includes program guide data and other types of data such as metadata associated with the guide data. Security is important for fixed user devices and mobile devices. Security for fixed user devices is somewhat easier than a mobile device in that a dedicated network is typically used. For mobile devices, various networks in different locations may be used to communicate.

Various types of data may be provided for a user device. Obtaining the data and managing the data is important for mobile device applications.

SUMMARY

The present disclosure provides a system and method for securely recognizing a mobile device and allowing access to data in response to the security.

In one aspect of the invention, a method includes communicating a request for an electronic token (eToken) to a first server, communicating the eToken, a signature key, and a server time, determining a signature using the server time and signature key, and communicating a request for data from a user network device to a second server. The request for data includes a signature. The method includes communicating the data from the second server to a user network device.

In another aspect of the invention, a system includes a first server and a user network device that requests an electronic token (eToken) from the first server. The first server communicates the eToken, a signature key, and a server time. The user network device determines a signature using the server time and signature key and communicates a request for data to a second server. The request for data includes a signature. The second server communicates data to a user network device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

The word service is used to convey hardware, software or a combination thereof. The service may be implemented in a computer file server. Servers may be standalone or combined to have various functions. The servers may be physically located in one location or multiple locations. More than one actual server device may perform a particular function. When more than one server is used, they may be distributed geographically. Servers have an associated memory in which data is stored. Servers provide different functions to prevent overloading and maintain service speed.

Figure 1:
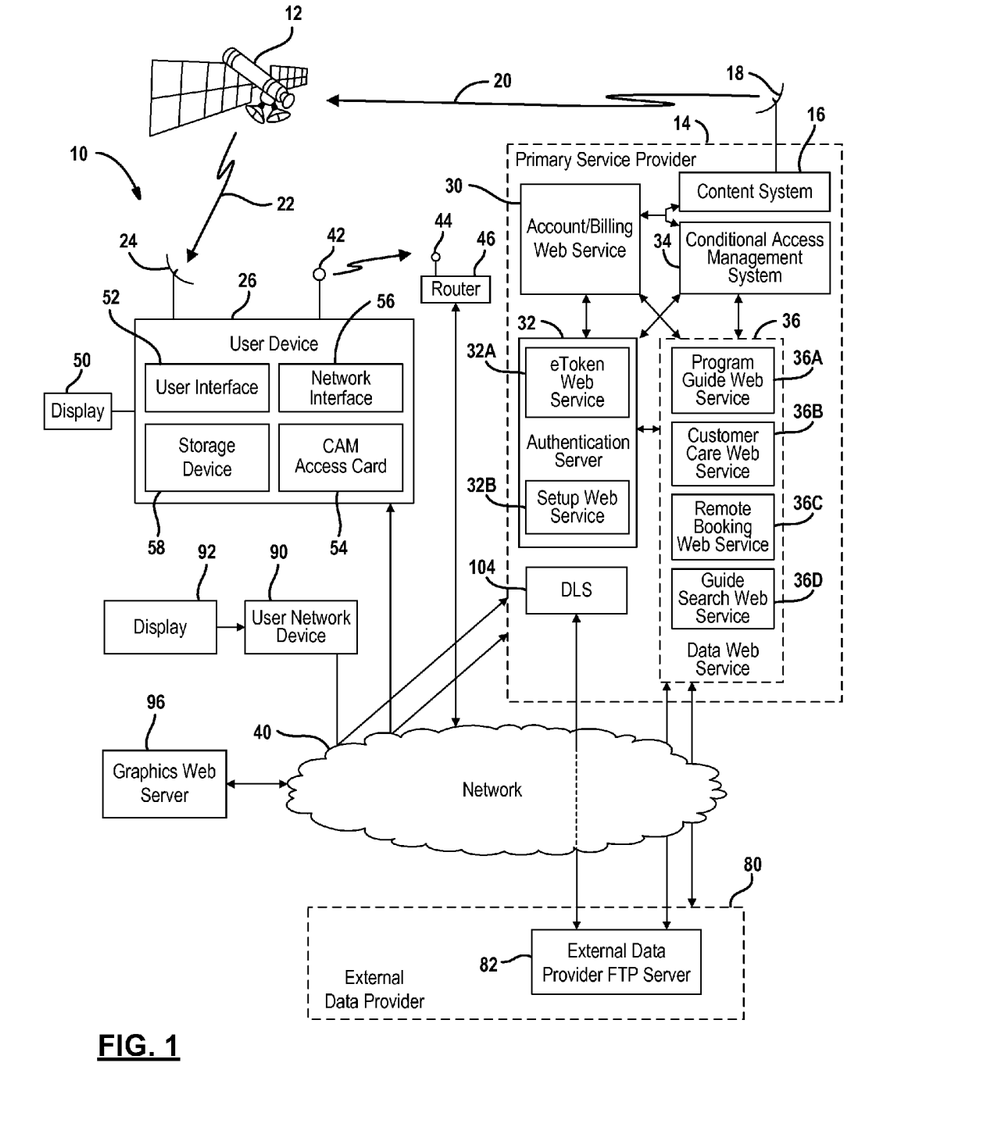
FIG. 1 is a block diagrammatic view of a first embodiment of a satellite communication system according to the present disclosure.

Referring now to FIG. 1, a satellite television broadcast system 10 is illustrated. The satellite television broadcast system 10 is illustrated by way of example. However, the present disclosure is not so limited hereto as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. The uplink signals 20 may be television signals and more specifically digital television signals. The uplink antenna 18 communicates the uplink signals 20 to the satellite 12 which in turn generates downlink signals 22. The downlink signals 22 are communicated to a receiving antenna 24 on a user device 26. Although only one user device 26 is illustrated, several user devices may be provided in the system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices may be used such as a cable television set top box. Other types of user devices may include a mobile device such as a lap top computer, cellular phone, personal digital assistant, a portable media player or an automotive-based television receiving device. Thus, the user device may be a fixed user device in the case of a satellite television set top box or a mobile user device. Both fixed and mobile devices may be used in a system.

The primary service provider 14 may also include an account/billing web service 30 and an authentication server 32. The authentication server 32 may include an encrypted token (eToken) web service 32A and a setup web service 32B. The eToken web service 32A may be used to generate and validate eTokens. The generation and validation process will be further described below. The setup web service 32B may be used to setup or establish information so that an eToken may be generated. The set-up process will be described further below.

The primary service provider 14 may also include a conditional access management system 34. The conditional access management system 34 may be used to grant conditional access to various programming as well as provide recording commands to the user device 26 as will be described below.

The primary service provider 14 may also include a data web service 36. The data web service 36 may include a programming guide web service 36A, a customer care web service 36B and a remote booking web service 36C.

The program guide web service 36A may be used to generate program guide data and information regarding various programming that is available. The program guide web service 36A, as will be described below, may generate custom programming guide information based upon the subscription to which a user is subscribed. The program guide web service 36A may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide.

The program guide web service 36A may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The customer care web service 36B may be used to generate and provide users with various types of help mechanisms to resolve technical issues.

The remote booking web service 36C may be used to generate remote booking commands or recording instructions as will be described below. The remote booking commands or recording instructions may be transmitted through the uplink antenna 18 to the satellite 12 and downlinked through the downlink signal 22 to an antenna 24 on the user device 26. A remote booking command may then initiate the user device 26 to store content broadcast by the satellite 12 thereon.

A guide search web service 36D may be used to provide searching capabilities to customers of the partner service provider. The searching may take place using stored data within the DIRECTV® listing service 104. The searching as described below may be for linear content, non-linear content or a combination of linear and non-linear content. Both types of content could be made available to customers of the primary service provider to search. Customers of the partner service provider and not of the primary service provider may also be provided with access to linear content and potentially non-linear. This may allow potential primary service provider customers to see the wide variety of choices provided by the primary service provider. Non-customers of the provider system may be referred to as a generic user. Generic users may thus be provided with search results from national channels and local channels, if location information is provided.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The primary service provider 14 may be in communication with an external data provider 80. The external data provider 80 may provide the program guide web service with program guide data, a product data, graphics data and data about specific actions, celebrities, producers, and the like. Metadata may also be provided by the external data provider 80. The metadata may include various descriptions, and the like. One example of an external data provider is the Tribune Media Service® (TMS). TMS® is a commercial service that provides various product content data such as metadata and schedules to service providers. Other data providers may be used. The external data provider 80 may provide unique identifiers for each piece of content. The data provided by the external data provider 80 may include movie data, graphics types, TV show data, celebrity data, TV show cards, and other data. Data may also be provided for upcoming movies, shows and other events. The external data provider 80 may include a file transfer protocol server 82 for transferring files in a desired format.

The system may also include a user network device 90 that includes a display 92. The display 92 may be separate or integrated into the user network device 90. The user network device 90 may be a web browsing device such as a portable computer, a personal digital assistant, a portable video player, an automotive-based user device, or the like. For certain aspects of the disclosure, the set top box or user device 26 may be considered a user network device since browsing and obtain content and schedules may be performed therefrom. The user network device 90 may receive various data from the servers within the primary service provider 14. The display 92 may be used for displaying various program guide information, along with other information provided by the partner service provider. The other information may include financial information, weather information, voicemail information, or other types of information. The primary service provider 14 may provide the content to be displayed on a website in various manners together with or in addition to the program guide information or other information.

The primary service provider 14 may also include a television listing server (DLS) database 104. The television listing server database 104 may include data corresponding to various listings for various program times and schedules. The television listing server database 104 may be in communication with the external data provider 80.

The system may also include a graphics web server 96. The graphics web server 96 may provide graphics to the user network device 90 through the network 40 upon request. As will be described below, a link may be provided together with listing data from the primary service provider. The user network device 90 receives the link and follows the link to obtain graphics data from the graphics web server 96. The link provided by the primary service provider may include a content identifier that is used to retrieve the graphics corresponding thereto from the graphics web server 96.

Figure 2:
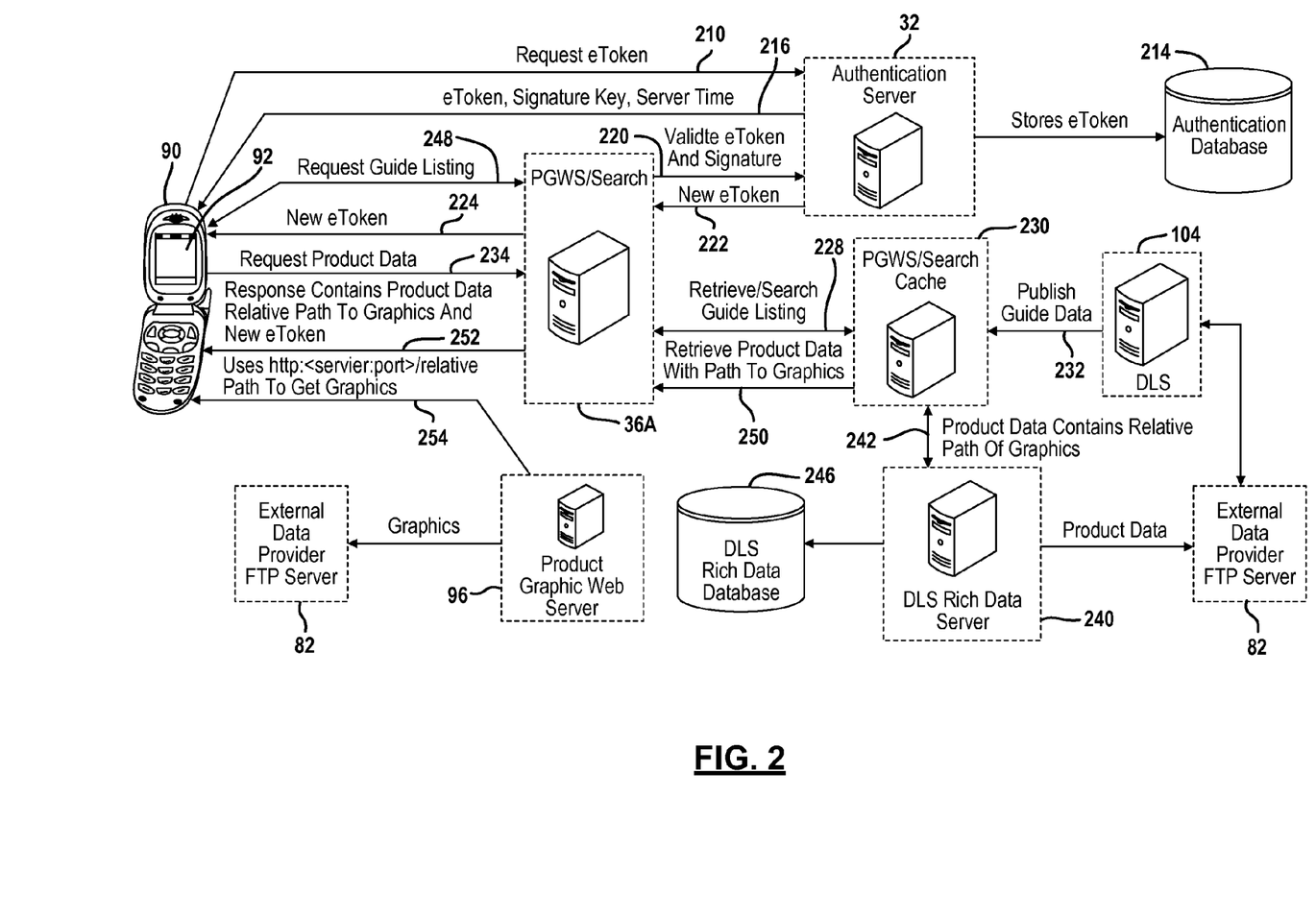
FIG. 2 is a block diagrammatic view illustrating further details of an authentication and data-providing system.

Referring now to FIG. 2, a detailed block diagrammatic view of the components of FIG. 1 is illustrated intercommunicating in further detail. The user network device 90 must be authenticated before data will be provided thereto. In step 210, a request for an encrypted token (eToken) is generated. The request for an eToken may also include a site ID, a site user ID and a password. The site ID and password may correspond to a site identifier for the primary service provider or to an external service provider through which the request is being made. When the authentication server receives the request for eToken 210, the password and site identifier are verified. An eToken is generated at the authentication server 32 and a token is stored within the authentication database 214. The eToken is communicated along with a signature key and server time in step 216. The signature key may be a key for encrypting a signature at the user network device 90.

In step 218, a request for guide listing or other data may be generated. It should be noted that the request for a guide listing or other data may be performed simultaneously or just after the request for an eToken. The user of the user network device 90 may not be aware that two different processes take place. The request for eToken and the generation of the eToken between the authentication server 32 and the user network device 90 may not require any further interaction than an initial request. In step 218, the request for data may also include the eToken and a signature. The signature may be generated from the server time. The signature may be a coordinated universal time (UTC). The signature field may be encrypted using the signature key from step 216. The server time is provided from the authentication server 32 and is used to calculate the value. To calculate the signature time, the time elapsed from the request to eToken to the time just before the request for the guide listing is determined and added to the server time. The request for data, such as the guide listing data, may be provided to the program guide web service 36A. Prior to providing data from the program guide web service, step 220 validates the eToken and signature. A new eToken may also be generated and communicated back to the user network device through the program guide web service 36A. The new eToken may be provided in step 222 from the authentication server 32 to the program guide web service 36A. A new eToken may be provided from the program guide web service to the user network device 90 at step 224.

Once the program guide web service 36A validates the request, a request to retrieve or search guide listings is provided in step 228 to a program guide web service cache 230. The program guide web service cache may receive data from the DIRECTV® listing service 104. The data from the listing service may be provided from the external data provider FTP server 82.

When new data is provided, a request to publish guide data may be generated in step 232. The DIRECTV® listing service (DLS) 104 may provide basic grid guide data.

The user network device may generate a separate product data request 234 based on the graphical user interface presented to the user from the guide data. The product data may contain data about the content and metadata. A DLS product rich data server 240 may provide product data or other data to the program guide web service search cache 230 in step 242. The graphics or other data may be provided from the external data provider FTP server 82. Graphics data may be temporarily stored on the DLS product database 246 which is ultimately provided to the program guide web service cache 230. The produce database 246 may be referred to as rich data due to the wide variety of data that may be included.

In step 250, the product data may be provided with the metadata from the DLS product server 240. In step 252, the response to the user network device 90 may include the product data as well as the relative path to graphics provided within the product graphics web server 96. The link or path provided in step 252 may initiate the user network device 90 to retrieve the graphics from the product graphics web in step 254. It should be noted that the graphics web server 96 may also obtain the data from the FTP server 82.

Figure 3:
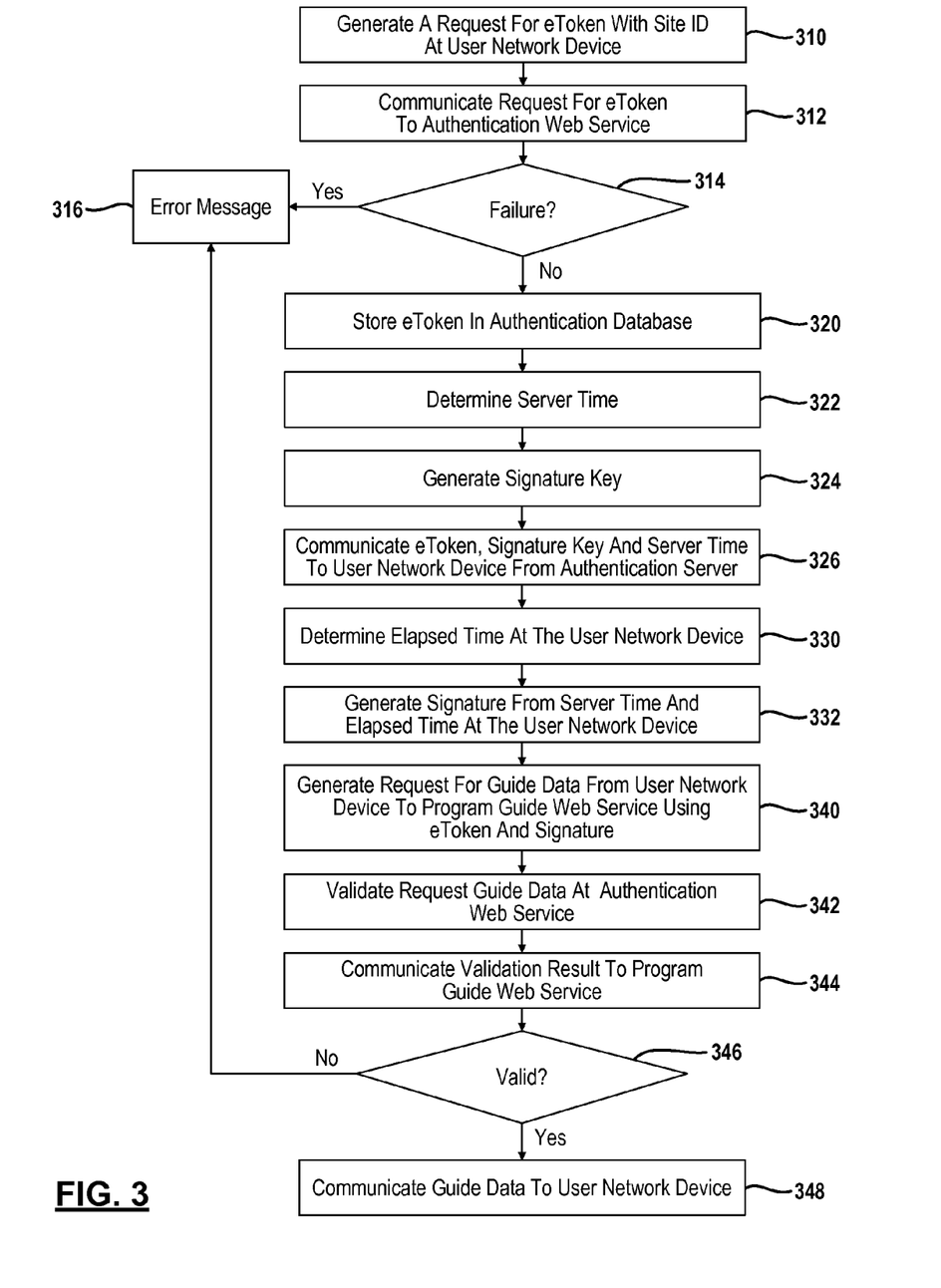
FIG. 3 is a flowchart of a method for providing data securely to a user device.

Referring now to FIG. 3, a method of providing data to the user network device 90 is set forth. In step 310, a request for an eToken with a site ID at the user network device, such as a mobile device, is performed using some type of identification. For example, a site identifier, a password and a user identifier may each be used individually or together. In step 312, a request for an eToken is communicated to the authentication web server 32 illustrated in FIGS. 1 and 2. The password, site identifier or other identifying data from the user network device 90 may determine whether or not there is a failure. If there is a failure in step 314, step 316 generates an error message to the user network device 90. Data is thus not provided to the user network device when a failure occurs. In step 320, the eToken is stored within the authentication database. In step 322, a server time is determined. The server time is the time the server either receives the request for an eToken or a time just prior to sending the eToken back to the user network device 90. In step 324, a signature key is generated at the authentication server. The signature key may be a key that the user network device 90 uses for encrypting a signature generated at the user network device 90.

In step 326, an eToken, signature key and server time are communicated to the user network device from the authentication server.

In step 330, the elapsed time between the request for an eToken and the receipt of the eToken may be determined at the user device. This time may also be the time between the request for eToken and the request for data from the program guide web service. In step 332, the signature is determined at the user network device. As mentioned above, the signature may be the elapsed time plus the server time. The signature may then be encrypted using the signature key. In step 334, the request for guide data is communicated from the user network device to the program guide web service along with the eToken and signature key. The eToken and signature key may be communicated simultaneously with the request for guide data or other data.

In step 342, the request for guide data is validated at the authentication web service. That is, the signature and eToken may be provided from the web server to the authentication server. The authentication server generates an authentication signal when the signature and eToken are proper. To determine whether a signature is proper, the time within the signature may be compared to the current time. When the difference between the current time and the signature time are too far apart, the request will not be validated. Thus, the server time must be within a predetermined time period from the signature time for the request to be valid.

The validation result signal is communicated from the authentication web server to the program guide web service 344. If the result is not valid in step 346, an error message may be generated in step 316 and communicated back to the user network device 90. In step 346, when the validation is valid, step 348 may communicate guide data or other data from the web server to the user network device.

Figure 4:
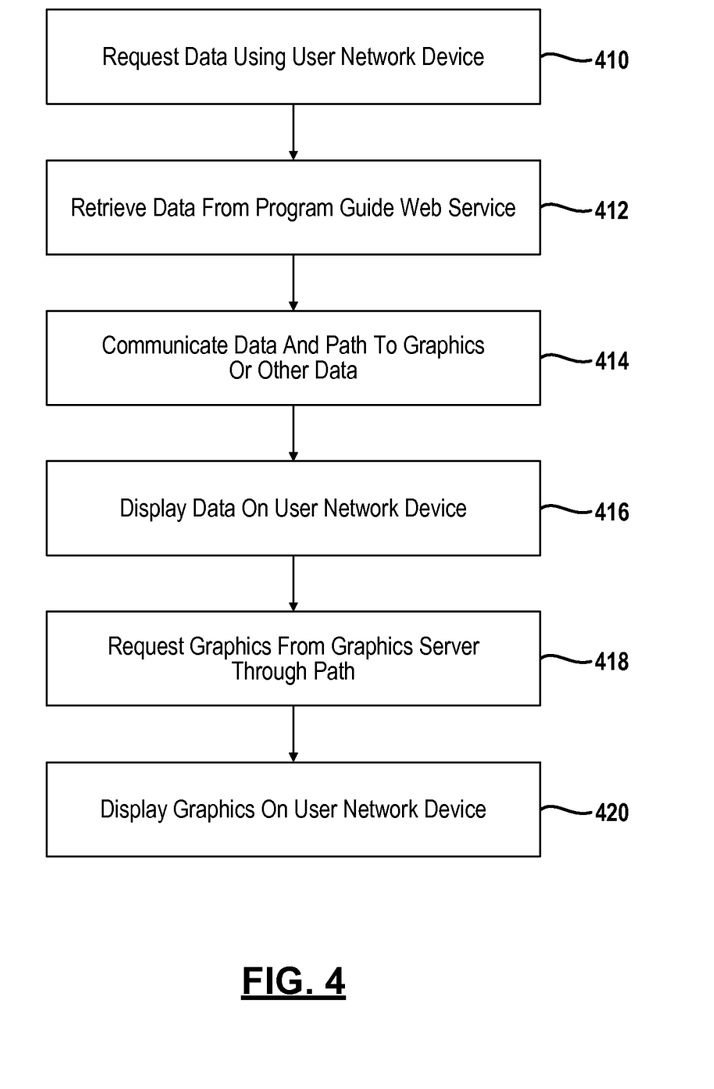
FIG. 4 is a flowchart of a method for providing different types of data to a user device.

Referring now to FIG. 4, a method for providing data to the user network device is set forth. In step 410, the request for product data is generated. The request for product data may be generated as described above in step 340. The request for product data may be provided in addition to the request for a guide listing. The request for product data may be made by selecting a portion of a screen display or graphical user interface within the listing service. The request for product data may include requests for detailed information such as a show card, detailed data regarding the actors or celebrities involved, the various types of movie data promotions, and the like.

The product data may be retrieved from the DLS product server through the program guide web service. A link or path to graphics data may also be provided with the product data. In step 414, the product data and the path to the graphics or other data is provided. In step 416, the product data is displayed at the user network device. In step 418, the user network device may request graphics from a graphics server through the path provided in the link. The graphics server may be a different server than the server that provided the product data. The graphics are displayed on the user network device in step 420. Because of the relative speed of providing data, the appearance to the user of the user network device is that the graphics is displayed nearly simultaneously with the other product data.

Figure 5:
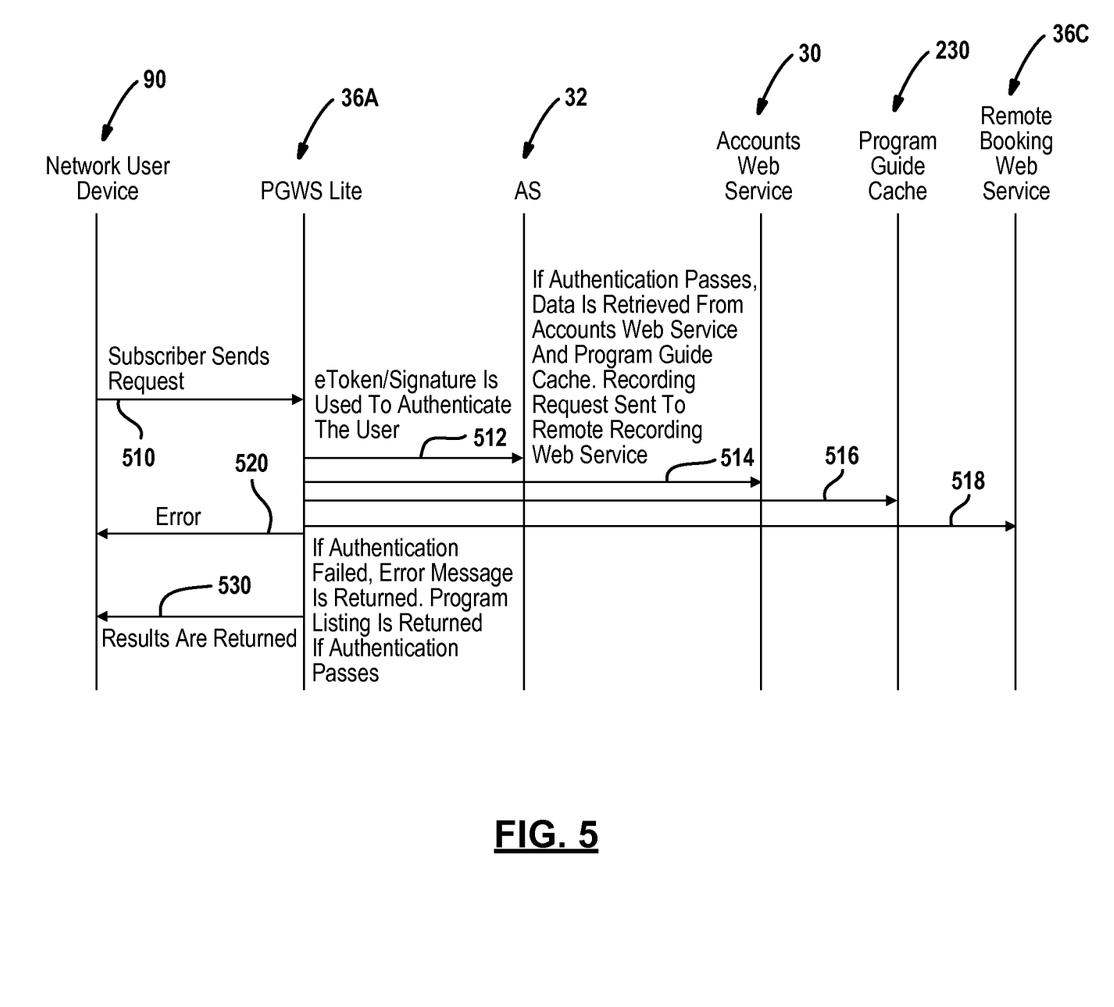
FIG. 5 is a sequence diagram of a method for providing data to a user device.

Referring now to FIG. 5, a method for providing data to the user network device 90 is set forth. In step 510, a subscriber sends a request for data. The request may include an eToken and signature. The requested data may be product data, guide data, metadata or graphics data. In step 512, the eToken and signature is used to authenticate the user at the authentication server 32. If a remote recording request is provided, the account web service determines the account information or data for the particular user. The program guide cache may be provided to the user in step 516 from the program guide cache 230. In step 518, a booking request is provided to the remote booking web service 336C. If authentication fails, step 520 returns an error. If authentication passes and a remote recording or other data request is authenticated, step 530 returns the results from the program guide web service to the network user device.

Figure 6:
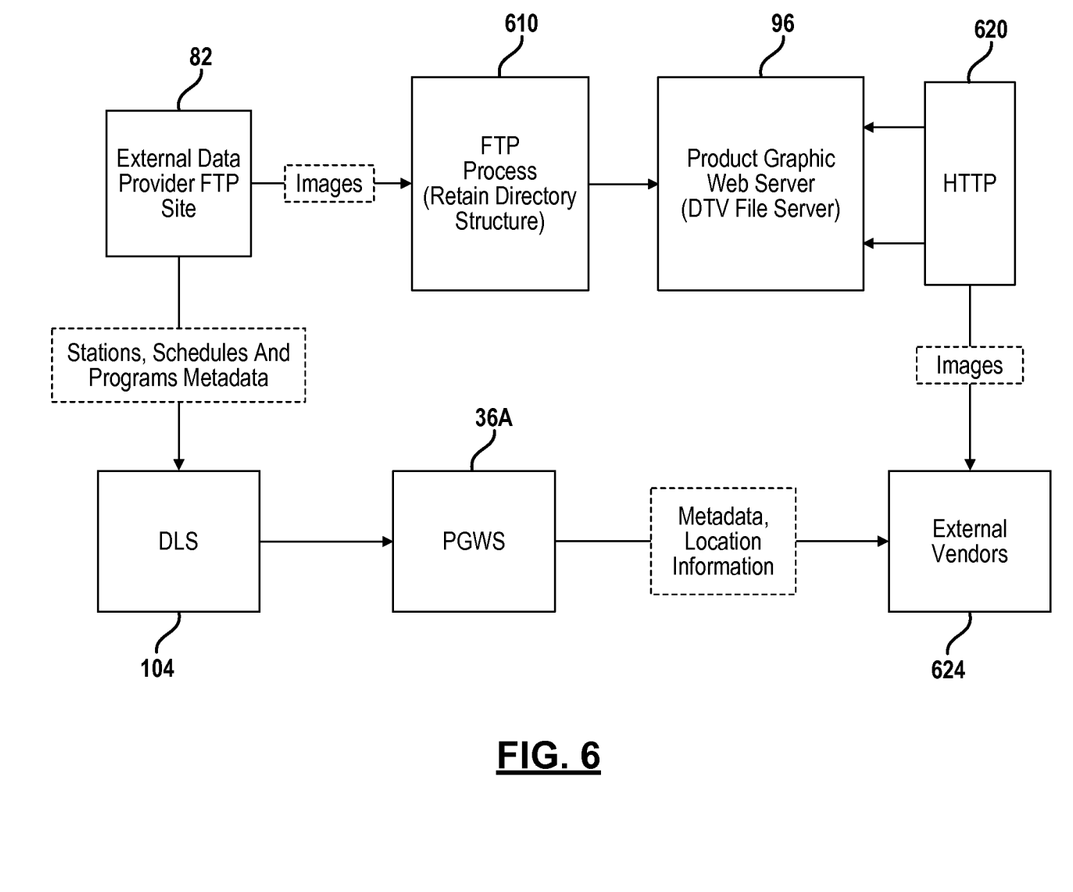
FIG. 6 is a simplified block diagrammatic view of a system for providing data from an external system for distribution to a mobile device through a web server.

Referring now to FIG. 6, a file transfer process 610 may be disposed between the external data provider FTP server 82 and the product graphics web server 96. The file transfer process may be JAVA or other types of processes. The product graphics web server 96 may be part of the primary service provider or controlled by the primary service provider. The product graphics web server 96 may also be controlled by a third party. Graphic images may be provided from the external data provider FTP server 82 to the product graphics web server 96 and later provided to user devices through the internet represented by HTTP block 620.

The external data provider FTP server 82 may provide to the DLS 104 various data including the broadcast stations, schedules and various program metadata. The DLS 104 provides various types of data to the program guide web service 36A. Metadata and location information may be provided external vendors 624. External vendors, such as a secondary service provider, may also receive images through the internet 620. The external vendors 624 may provide the data to the user network devices 90.

Figure 7:
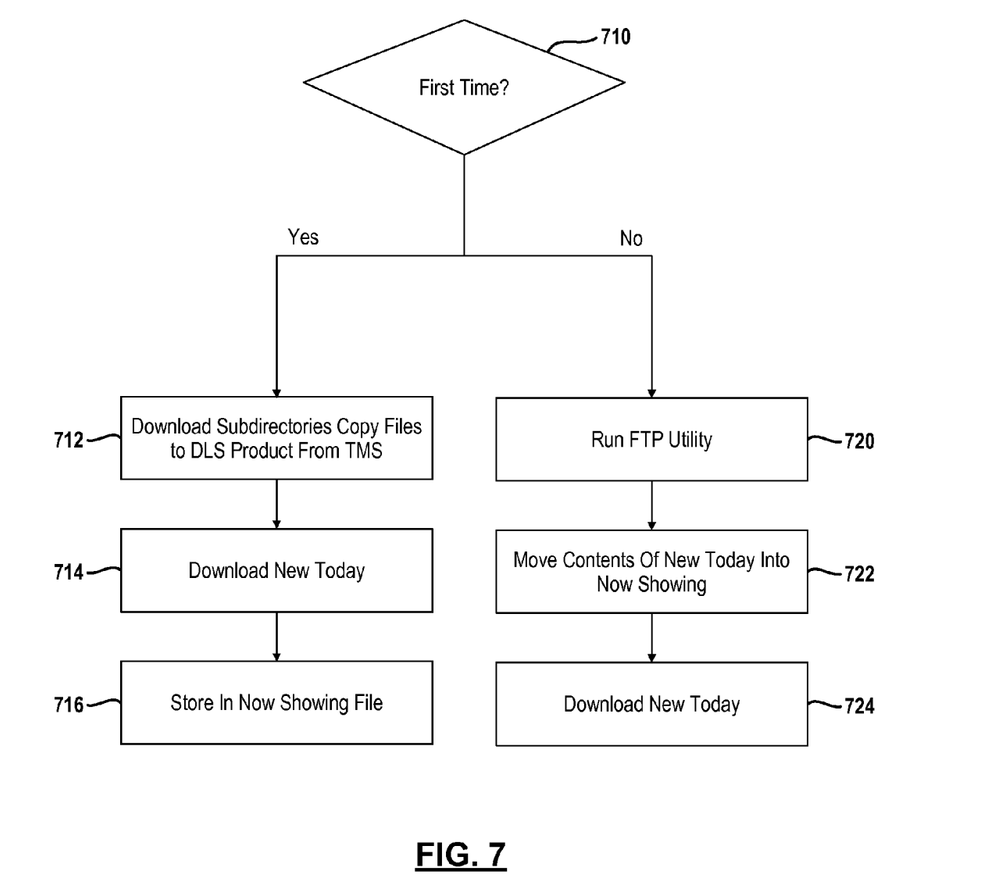
FIG. 7 is a flowchart of a file transfer protocol used by the system of FIG. 6.

Referring now to FIG. 7, a method for operating the file transfer protocol is set forth. In step 710, it is determined whether the file transfer protocol is the first being used. If this is the first time the file transfer protocol is being used, step 712 is performed. In step 712, the subdirectories are downloaded to the DLS product server 240. The DLS product server may retrieve data from the database such as the product data server 82. To determine whether the first time through the system is being performed, a history folder may be checked. If the history folder is not present, this may be the first time through the system and step 712 is performed. A "new today" file may also be downloaded. The "New Today" file that corresponds to an incremental amount of data for a particular day or other time period. The period for downloading the incremental file depends on the period for which updates are provided. Hourly, daily, twice daily may be suitable update periods. In this example, one day was used as the update period and consequently the incremental file is named "New Today." In step 714, the "new today" file may be downloaded from the server 82. The new today directory may be copied into a "now showing" file in step 716. The DLS product stores product data such as various types of metadata for different data identifiers or material identifiers for various content.

If this is not the first time through the process in step 710, step 720 runs a file transfer protocol (FTP) utility. In step 722, contents of the new today directory within the external data provider FTP server 82 are copied onto the product server 240. The new today folder is downloaded in step 724. Steps 720-724 may be performed periodically such as on a daily basis. Thus, only the incremental data may be stored within the DLS product server 240 rather than an entire new database. Only when required will the PGWS search cache 230 provide various types of product data. The DLS product may also store various paths for obtaining graphics from the product graphics web server 96 illustrated in FIG. 2.

Figure 8:
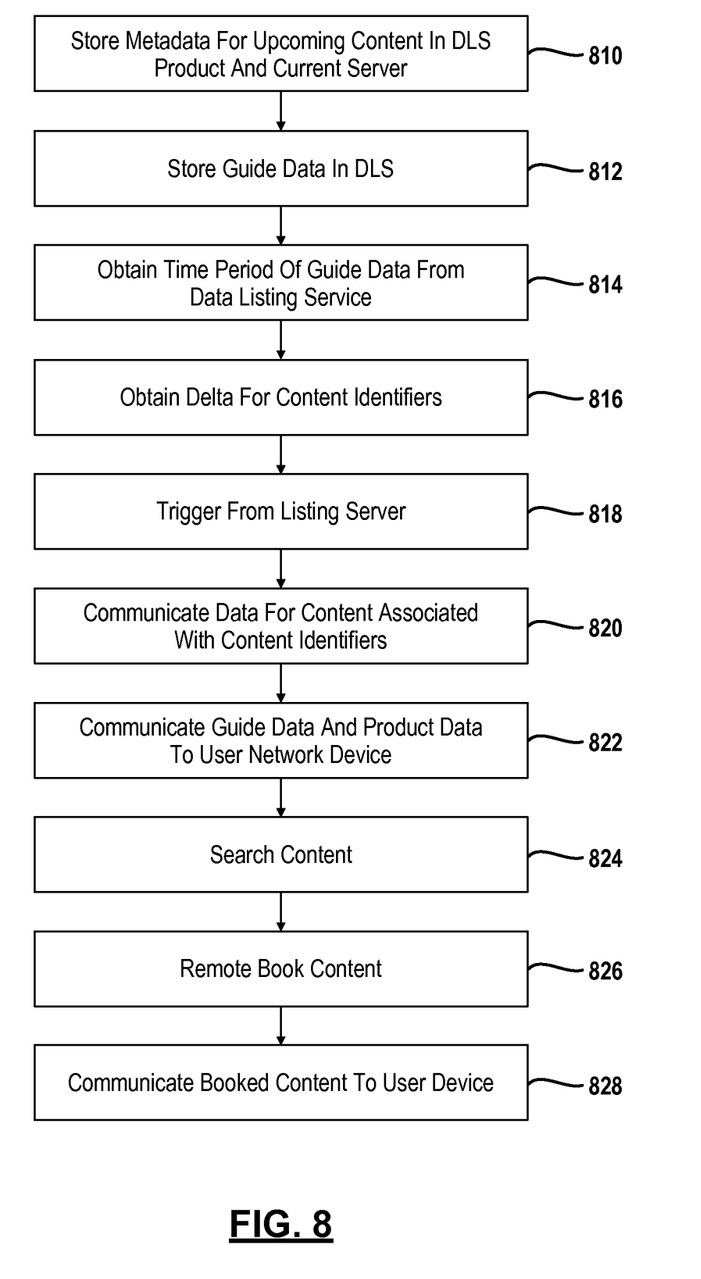
FIG. 8 is a method of providing data in the system of FIG. 6.

Referring now to FIG. 8, product data, such as metadata for upcoming content and current content, is stored within the DLS product server. Guide data is stored within the DLS 104 of FIG. 2 in step 812. In step 814, a time period of guide data from the data listing service is provided. In step 816, a delta for content identifiers is provided. The delta for content identifiers provides the content identifiers for the change in the guide data. Product data may thus be obtained from the DLS product server when a change in the guide data is received by the program guide web service 230. A trigger from the DLS is received in step 818. The trigger publishes the guide data to the PGWS search cache 230. The publish guide data command from the DLS 104 also initiates the DLS product server 240 to communicate the product data for the content identifiers in the delta file. In step 820, the data for the content associated with the content identifiers is communicated to the program guide web service search cache 230. The program guide web service 36A communicates the product data and the guide data to the user network device in step 822. The guide data may be provided separate than the product data.

A search may be performed in step 824 at the user network device. The search may be performed by merely searching the guide listing without the product data or may be provided using the product data. The product data may also be provided after a search in request to a selection at the user network device from the graphical user interface associated therewith. Searching is an optional item because recording selections may be provided directly from the guide data. In step 826, remote content may be booked using the guide data and product data. In step 828, booked content may be communicated to a user device. Booked content may be communicated over a satellite or other network. The booked content may be stored in a set top box, or the like. Content may be booked by generating a conditional access packet and providing the conditional access packet to the user device so that the user device records or stores the content data within a storage device such as a hard drive therein. The booked content may then be viewed on the display of a user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A method comprising:
communicating a request for an encrypted token to a first server from a user network device;
communicating the encrypted token, a signature key, and a server time from the first server to the user network device;
determining a signature using the server time and signature key at the user network device;
communicating a request for data from the user network device to a second server, said request for data including the signature and the encrypted token; and
communicating the data from the second server to the user network device.

2. A method as recited in claim 1 wherein communicating the request for the encrypted token comprises communicating a site identifier to the first server.

3. A method as recited in claim 1 wherein communicating the request for the encrypted token comprises communicating a user identifier to the first server.

4. A method as recited in claim 1 wherein communicating the request for the encrypted token comprises communicating a site identifier and a user identifier to the first server.

5. A method as recited in claim 1 wherein communicating the request for the encrypted token comprises communicating a site identifier, a user identifier and a password to the first server.

6. A method as recited in claim 1 wherein communicating the request for the encrypted token comprises communicating the request for the encrypted token from a mobile device.

7. A method as recited in claim 1 wherein communicating the request for the encrypted token comprises communicating the request for the encrypted token through a wireless network.

8. A method as recited in claim 1 wherein communicating the request for the encrypted token comprises communicating the request for the encrypted token from the user network device.

9. A method as recited in claim 1 further comprising requesting the encrypted token from an authentication server.

10. A method as recited in claim 1 wherein determining the signature comprises determining the signature from an elapsed time and the server time.

11. A method as recited in claim 10 further comprising determining the elapsed time between requesting the encrypted token from the first server and generating the request for data from the second server.

12. A method as recited in claim 1 further comprising validating the request for data based on the signature and the encrypted token.

13. A method as recited in claim 1 further comprising validating the request for data based on the signature and the encrypted token at the first server.

14. A method as recited in claim 1 wherein communicating the request for data comprises communicating a request for program guide data.

15. A method as recited in claim 1 wherein the user network device comprises a mobile device.

16. A method as recited in claim 1 wherein the user network device comprises a set top box.

17. A system comprising:
a first server;
a user network device that requests an encrypted token from the first server;
said first server communicating the encrypted token, a signature key, and a server time to the user network device;
said user network device determining a signature using the server time and the signature key and communicating a request for data to a second server, said request for data including the signature and the encrypted token; and
said second server communicating data to the user network device.

18. A system as recited in claim 17 wherein the user network device requests the encrypted token and communicates a site identifier to the first server.

19. A system as recited in claim 17 wherein the user network device requests the encrypted token and communicates a user identifier to the first server.

20. A system as recited in claim 17 wherein the user network device requests the encrypted token and communicates a site identifier and a user identifier to the first server.

21. A system as recited in claim 17 wherein the user network device requests the encrypted token and communicates a site identifier, a user identifier and a password to the first server.

22. A system as recited in claim 17 wherein the user network device comprises a mobile device.

23. A system as recited in claim 17 wherein the user network device requests the encrypted token through a wireless network.

24. A system as recited in claim 17 further comprising an authentication server providing the encrypted token.

25. A system as recited in claim 17 wherein the signature is based on an elapsed time and the server time.

26. A system as recited in claim 25 wherein the elapsed time is a time period between a first request for the encrypted token and the request for data.

27. A system as recited in claim 17 wherein the second server receives the request for data, the signature and the encrypted token from the user network device and communicates the request for data, the signature and the encrypted token to the first server, said first server validating the request for data based on the signature and the encrypted token.

28. A system as recited in claim 17 wherein the request for data comprises a request for program guide data.

29. A system as recited in claim 17 wherein the first server comprises an authentication server and the second server comprises a program guide data server.

30. A system as recited in claim 17 wherein the user network device comprises a mobile wireless device.

* * * * *